Feb. 2, 1932.  J. C. KARCHER  1,843,725
DETERMINATION OF SUBSURFACE FORMATIONS
Filed May 1, 1929  2 Sheets-Sheet 1
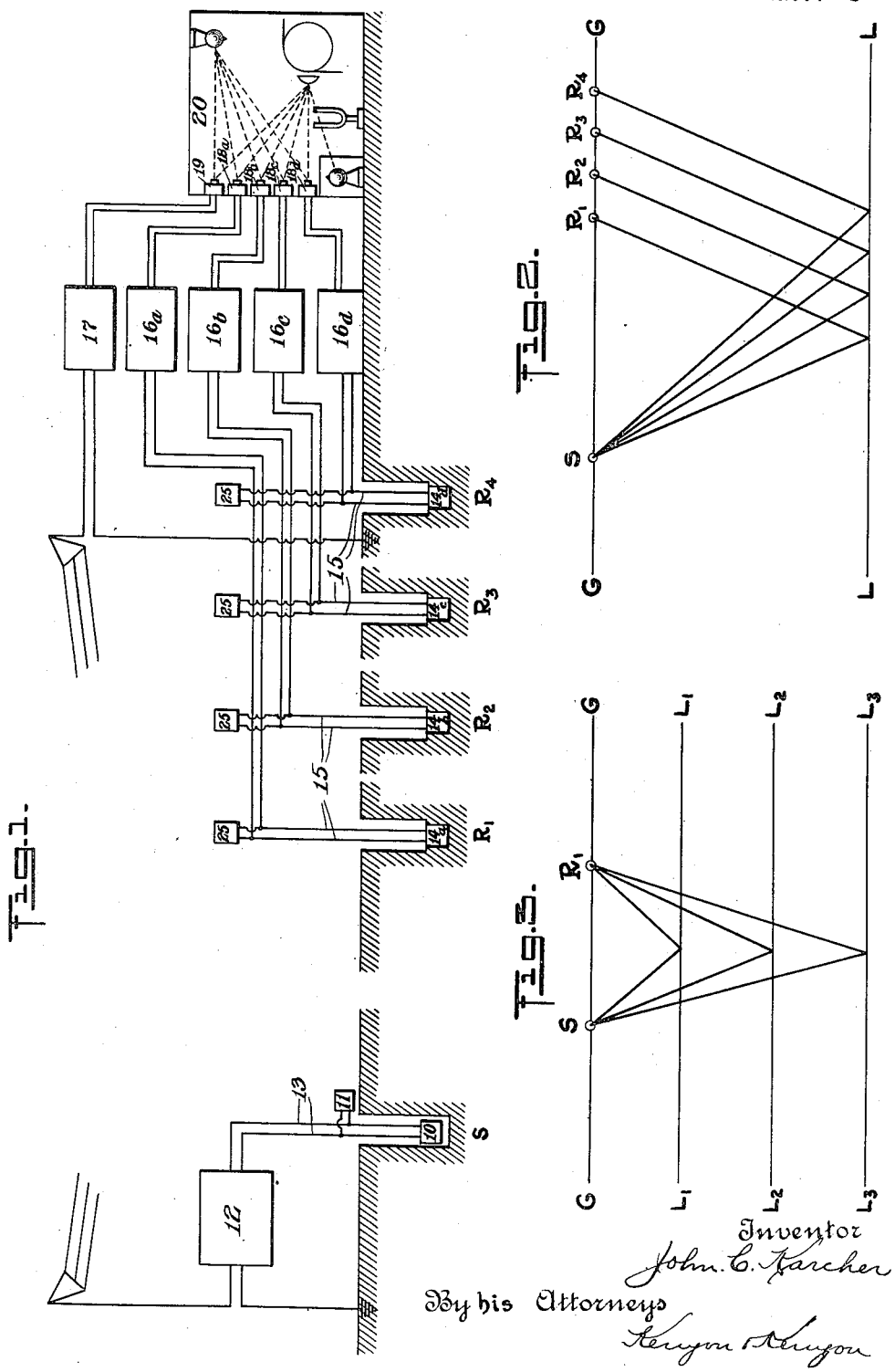

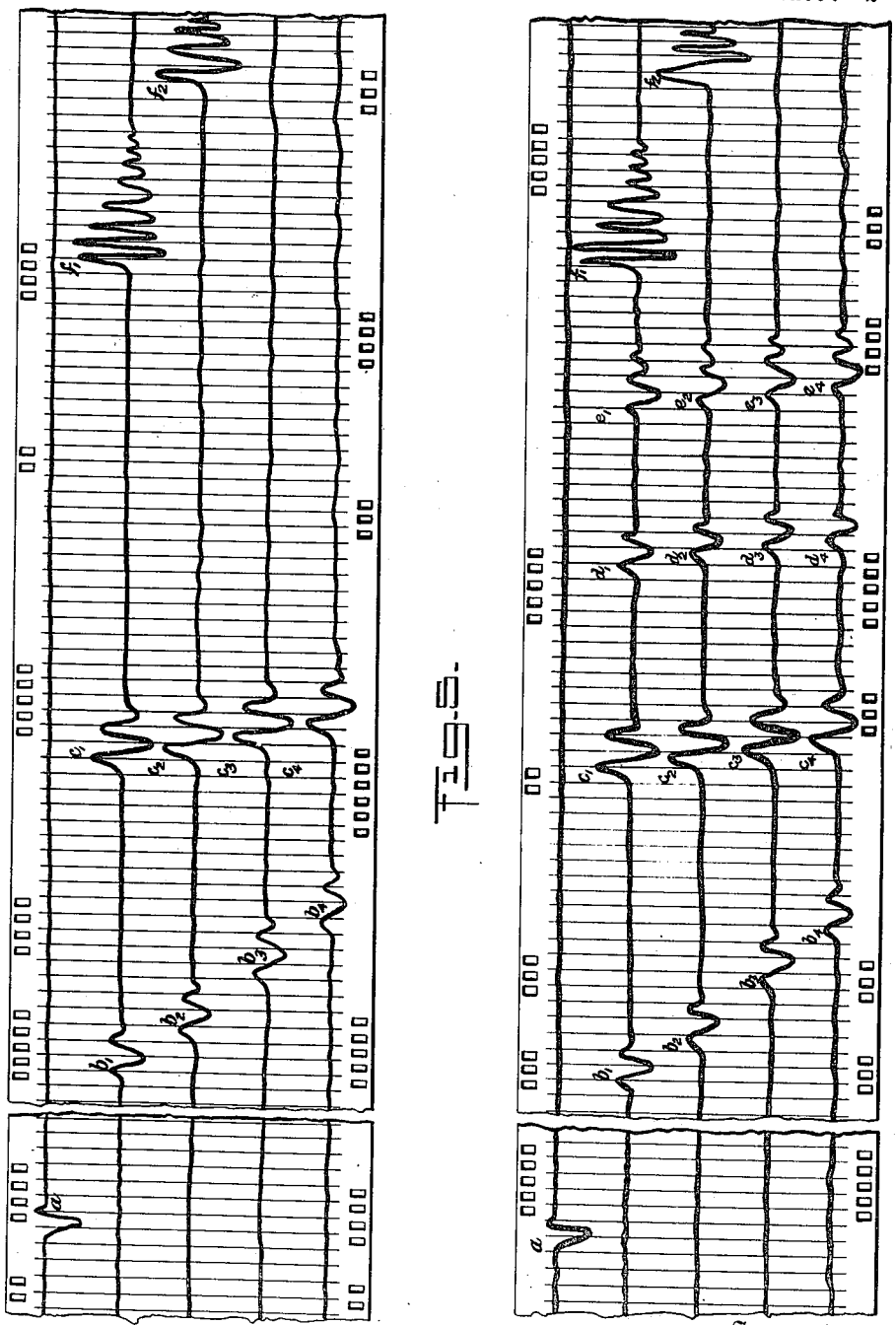

Patented Feb. 2, 1932

1,843,725

UNITED STATES PATENT OFFICE

JOHN CLARENCE KARCHER, OF MONTCLAIR, NEW JERSEY, ASSIGNOR TO GEOPHYSICAL RESEARCH CORPORATION, OF NEW YORK, N. Y., A CORPORATION OF NEW JERSEY

DETERMINATION OF SUBSURFACE FORMATIONS

Application filed May 1, 1929. Serial No. 359,587.

This invention relates to methods of and apparatus for determining the location and depth of geological formations beneath the surface of the earth and particularly to the determining of geological folding in these sub-surface formations. This invention has special application in the location of anticlines, faults and other structure favorable to the accumulation of petroleum.

It has heretofore been recognized that sub-surface formations may be investigated by observing the velocity of elastic waves transmitted through such formations from sending to receiving stations where one or more of the stations are located near the earth's surface and the stations are approximately on opposite sides of the formation under examination. In the present invention, I determine the location and depth of a sub-surface formation by observing waves transmitted through the earth to the sub-surface formations and reflected directly by it to the point of observation, the source of the waves and the receiving or observation point preferably being so related that the angle of incidence of the sound waves upon the sub-surface formation approaches the critical angle of reflection between the sub-surface formation and the stratum above the same. By measuring the time required for waves to travel from their source to the sub-surface formation and be returned to the earth's surface, a determination may be made of the depth and location of the sub-surface formation. By a novel arrangement and combination of sending and receiving devices, I am able to make such measurements without the necessity of deep borings or wells and without the necessity of elaborate transmitting machinery. Moreover, I am able to make the determinations more quickly and more economically than has heretofore been possible and I am also able to attain far greater accuracy of survey than has previously been attained.

The physical conditions necessary are that somewhere within the sub-surface there is a surface of discontinuity at which the velocity of propagation is found to be different on the opposite sides thereof. Such condition is very often found in sub-surface structure, for example, the contact surface between a bed of shale rock and a bed of limestone rock is a very excellent reflector of elastic waves.

In my Patent No. 1,706,066, of March 19, 1929, there is disclosed a method of making determinations of depth in which observation is made of waves which travel into the earth at the critical angle of reflection between the two media, the depth of whose boundary is to be determined. The wave follows along the boundary and is reinforced by waves traveling into the earth at other angles and propagate waves which emerge at the various points of observation. In the present method, observation is made of waves which travel into the earth and are reflected directly from the upper surface of the sub-surface formation to the receiving or observation point.

In the present method of determining the depth of a sub-surface formation, use is made of waves which are transmitted downwardly into the earth more nearly vertically than heretofore and are directly reflected from the sub-surface layer in question to the earth's surface at a point which is usually a distance away from the source that is substantially less than the depth of the sub-surface formation. In this method, it is necessary only to know the velocity of the elastic waves in the upper stratum which can be accurately determined. As a consequence, there is no error introduced in the depth calculation as a result of uncertainty as to the velocity of propagation of the elastic waves under observation. Also since the horizontal distance is less than the depth of the reflecting layer the effect of errors in horizontal distance upon the depth determination is extremely slight. Furthermore, the total distance of travel of the elastic wave through the earth is reduced to a minimum thereby reducing materially the amount of charge necessary to produce the elastic waves.

In the accompanying drawings, Fig. 1 is a wiring diagram of transmitting and receiving apparatus adapted for carrying out the invention.

Figs. 2 and 3 are illustrative diagrams of paths of elastic waves through the earth, and Figs. 4 and 5 illustrate photographic films bearing graphic indications of the operation of the receiving devices shown in Fig. 1.

Referring now more particularly to Fig. 1, an explosive charge 10 is buried just far enough below the surface of the earth so that its detonation will produce suitable elastic waves in the earth. As sharp impulses produce best results, the explosive charge is preferably composed of dynamite or other explosive having high detonating velocity. In general, it is sufficient to place and tamp the charge tightly in a hole several inches in diameter and at a depth of from 8 to 12 feet below the surface. This insures that the explosion of the charge will not throw earth and also contributes to safety in the operation of exploding the charge. A second explosive charge 11 may be placed for detonation at the surface of the earth immediately above the charge 10. Nearby is located a wireless transmitter provided with means for operating the transmitter simultaneously with the explosion of the charge. All of the above described devices are located at what will be hereinafter referred to as the sending station S. The explosive charges 10 and 11 and the wireless transmitter 12 are connected by electrical wires 13 with a suitable source of electrical energy and appropriate means are provided for simultaneously detonating the charges and operating the wireless transmitter circuit. As a result, three sets of waves may be simultaneously propagated from the sending station; namely, sound waves traveling through the earth, elastic waves traveling through the earth and radio frequency electro-magnetic waves traveling through the air. At receiving stations hereinafter referred to as $R_1$, $R_2$, etc. means are located for detecting the three types of waves which originate at the source S. The elastic waves traveling through the ground are detected by means of geophones $14_a$, $14_b$, etc. below the surface of the earth, and similar to the geophones disclosed in my aforesaid Patent No. 1,706,066. The sound waves through the air may either be detected by the geophones above referred to or by means of a microphone 25 at each station and the radio frequency waves may be detected by a single appropriate radio receiver 17 arranged at any convenient location. The location of the receiving stations are so selected that the observed waves are reflected to them directly from the sub-surface formation.

If the distance between the sending and receiving stations is only a few hundred feet as is often the case, the wireless transmitter may be dispensed with and a direct wire connection between the sending and receiving stations may be made use of for recording at the receiving stations the time of the explosion at the sending station. The geophones of the different receiving stations R and the microphones 25 are electrically connected by wires 15 to the inputs of amplifiers 16, which in turn are suitably connected to operate oscillograph elements $18_a$, $18_b$, etc. These amplifiers are preferably but not necessarily of the transformer coupled type in order to filter out low amplitude waves and secure selectivity in the frequency of the recorded disturbances. As a result only indications on the film of the recorder are produced by the wireless waves, the sound waves transmitted through the air, the elastic waves transmitted directly from the source to the geophones and the waves reflected from the sub-surface formation to the geophones. This gives a record which may be easily read and readily understood. The wireless receiver 17 is connected to operate the oscillograph element 19. The oscillograph elements $18_a$, $18_b$, etc. together with the oscillograph element 19 are installed in and constitute a part of an oscillograph recorder 20. As the geophones $14_a$, $14_b$, etc. are spaced from each other, the oscillograph elements $18_a$, $18_b$, etc. will be operated successively and the records made by these elements on the film of the recorded will be spaced.

The operation of the method may be explained by reference to Fig. 1. After the instruments have been placed in position and the explosive charges have been properly wired into the electrical circuits, the film of the oscillograph recorder 20 is placed in operation and the explosive charges at S are detonated. Immediately a wireless wave is transmitted from the sending to the receiving station and the oscillograph element 19 is actuated to record the origin of the sound and elastic waves. Simultaneously sound waves start from S and travel through the air to arrive successively at the microphones 25 or geophones $R_1$, $R_2$, etc. and the oscillograph elements $18_a$, $18_b$, etc. record indications of their arrival on the film. Also simultaneously elastic waves travel through the ground from S. A portion of these waves travel directly to the geophones and subsequently arrive at the same, while another portion travels downwardly toward the sub-surface formation L, L and is reflected so as to also subsequently arrive at one of the receiving stations $R_1$, $R_2$, etc. (Fig. 2).

The arrival of these several waves at the respective geophones is recorded in proper order. Since the rate of travel of the recorder film is known, it is possible to determine the time intervening between the occurrence of the explosion and the arrival of the several waves at the various geophone positions. Since the velocity of sound in air is readily determinable the distance from S to $R_1$, $R_2$, etc. can be easily calculated by knowing the time required for the sound waves to travel from the sending station to the respective microphones or geophones.

The time for the travel of the reflected waves to the respective geophones can also be readily obtained from the film of the recorder. Having the distance of the several geophones from S and the times of travel of the respective reflected waves, it is a simple matter to determine the velocity of propagation of the reflected waves from the surface of the ground to the reflecting surface and back again to the surface of the ground. The depth of the sub-surface formation may then be determined as follows: Let the time of travel of a reflected wave from S to L L to $R_1$, be designated $t_1$, and let the distance from S to $R_1$ along the earth's surface be designated $d_1$. Then, if L L is substantially parallel to S $R_1$, the velocity V of propagation of the reflected wave and the depth D of the reflected stratum are related thus:

$$Vt_1 = \sqrt{d_1^2 + 4D^2} \text{ or } D = \tfrac{1}{2}\sqrt{V_1^2 t_1^2 - d_1^2}$$

and similarly if the time of travel of the reflected wave from S to LL to $R_2$ is $t_2$ and the distance from S to $R_2$ is $d_2$, then $$Vt_2 = \sqrt{d_2^2 + 4D^2} \text{ or } D = \tfrac{1}{2}\sqrt{V^2 t_2^2 - d_2^2}$$

solving the above equations simultaneously the following is obtained:

$$V^2 t_1^2 - d_1^2 = V_1^2 t_2^2 - d_2^2$$

$$V = \sqrt{\frac{d_2^2 - d_1^2}{t_2^2 - t_1^2}}$$

and $\quad t_2^2 d_1^2 - 4D^2 t_2^2 = d_2^2 t_1^2 - 4D^2 t_1^2$ $$D = \tfrac{1}{2}\sqrt{\frac{t_2^2 d_1^2 - d_1^2 t_2^2}{t_2^2 - t_1^2}}$$

By the application of the method of least squares the most probable value of V and D can be determined for any number of observations of $t$ and corresponding values of $d$.

As is often the case, the velocity of propagation of the elastic waves through the earth has been determined previous to a given set of observations. In this event, the depth from the surface to the reflecting layer only has to be determined.

Usually in making surveys by means of reflections as herein described, there is encountered a layer of altered or disintegrated rock near the surface which has a very low sound velocity. As a result, the time of travel through this altered layer is comparatively long and has to be taken into account in calculating reflection depths. In carrying out my investigation, it is the practice to determine the thickness of this altered layer by means of the defraction method described in my Patent No. 1,706,066. By means of this method I am able to determine both the thickness of this altered layer and the velocity of propagation of the disturbances through it. By means of this information I am able to make a correction in the time of travel through this layer and can, therefore, accurately calculate the depth to the deep sub-surface formation in the manner in which I have described even though this altered layer is present.

While it is desirable to make simultaneous use of a single explosion and a plurality of geophones at different receiving stations and thus produce a multiple record on a single film, it is possible to obtain the same results by use of a single geophone at successively placed different locations and successive detonations at the sending station.

By this method it is possible not only to determine the depth from the surface to one reflecting layer, but the depths of several successive reflecting layers can often be determined from a single set of observations. Fig. 3 indicates the path followed by waves reflected from successive layers.

In Figs. 4 and 5 are disclosed films on which are recorded indications of the arrival of the different waves at the various receiving or observing stations. In these figures, the arrival of the wireless wave is indicated by $a$, the indication being produced by the oscillograph element 19. The arrival of the different geophones of the elastic waves transmitted directly through the earth is indicated by $b_1$, $b_2$, etc., these indications being produced by the oscillograph elements $18_a$, $18_b$, etc. The arrival of the reflected waves at the different geophones is indicated at $c_1$, $c_2$, etc. and these indications are likewise produced by the oscillograph elements $18_a$, $18_b$, etc. At $f_1$, $f_2$ are indicated the arrival at the different receivers 25 or geophones of the sound waves transmitted through the air. This film is a record made from a single reflecting sub-surface formation. Where there are a plurality of sub-surface formations and waves are reflected from each, the film is similar to the above described film except that additional indications appear thereon. Fig. 5 dicloses such a film and in this disclosure $d_1$, $d_2$, etc. indicate the arrival of reflections from a second layer $L_2$, $L_2$, while $e_1$, $e_2$ indicate the arrival of reflected waves from a third reflecting layer $L_3$, $L_3$.

I claim:

1. The method of locating sub-surface formations which comprises simultaneously propagating an electromagnetic wave through the air, a sound frequency wave through the air and an elastic impulse through the earth, receiving a direct reflection of said elastic impulse, receiving said electromagnetic and sound waves at the point of reception of the elastic wave, recording the time of travel of the reflected elastic wave and the velocity of propagation thereof and determining therefrom the depth of the sub-surface formation.

2. The method of locating a sub-surface formation which comprises propagating elastic waves from a point adjacent the earth's surface and simultaneously generating an electric impulse, receiving and selectively recording waves traveling directly from the source to the receiving point and waves directly reflected to the receiving point from the sub-surface formation, receiving the electric impulse at said receiving point, determining the distance between the wave source and the receiving point, measuring the time of travel of the direct wave and the reflected wave, determining the velocity of propagation of the wave through the earth and calculating the depth of the sub-surface formation.

3. The method of locating a sub-surface formation which comprises detonating an explosive charge substantially at the surface of the earth, simultaneously generating an electric impulse, receiving a wave reflected directly from a sub-surface formation, receiving at the same place said electric impulse and the air sound waves produced by said detonation, determining the distance between the point of detonation and the point of reception of said waves, measuring the time of travel of the reflected wave and determining the rate of propagation of the reflected wave through the earth and the depth of the sub-surface formation.

4. The method of locating sub-surface formations which comprises transmitting an elastic earth wave from a point adjacent the earth's surface to a sub-surface formation, receiving a direct reflection of said wave at a second point adjacent the earth's surface such that the angle of incidence of the reflected wave approaches the critical angle of reflection, and measuring the time required for the reflected wave to arrive at said second point.

5. The method of locating a sub-surface geological formation which comprises simultaneously operating a wireless transmitter and detonating an explosive charge substantially at the earth's surface thereby simultaneously transmitting an electro-magnetic wave through the air, a sound wave through the air and an elastic wave through the earth, receiving and recording a wave directly reflected by a sub-surface formation, receiving said sound and electro-magnetic waves at the same point and recording the arrival thereof and from a plurality of such observations determining the velocity of propagation of the reflected elastic wave and the depth of the reflecting sub-surface formation.

6. The method of locating a sub-surface formation which comprises simultaneously generating an elastic wave in the earth a sound frequency wave in the air and an electric impulse, receiving a wave directly reflected from the sub-surface formation to the point of reception on the earth's surface, receiving the electric impulse and the sound frequency wave at said point of reception, measuring the time of travel of the elastic wave, determining its velocity of propagation and determining therefrom the depth of the sub-surface formation.

7. The method of locating a sub-surface formation which comprises simultaneously producing an electric impulse and detonating an explosive charge substantially at the surface of the earth, receiving at a distant point adjacent the earth's surface a wave propagated directly through the earth and a wave reflected by a sub-surface formation, receiving the electric impulse at said receiving point, determining the distance between the point of detonation and the receiving point of said waves, measuring the time of travel of the reflected wave and determining the velocity of propagation of said wave and the depth of the sub-surface formation.

8. The method of locating a sub-surface formation which comprises simultaneously generating an elastic wave in the earth, a sound frequency wave in the air and an electric impulse, receiving a direct reflection of said elastic wave, receiving said electric impulse and sound frequency wave at the point of reception of the reflected wave, measuring the time of travel of the reflected wave and determining therefrom the depth of the sub-surface formation.

9. The method of locating a sub-surface formation which comprises simultaneously generating elastic waves in the earth, sound frequency waves in the air and an electric impulse, receiving at a distant point a wave reflected thereto from a sub-surface formation, receiving at said point an elastic wave transmitted directly thereto through the earth, a sound wave and the electric impulse, determining the distance from the wave source to the receiving point, determining the velocity of propagation of the elastic wave through the earth and therefrom determining the depth of the sub-surface formation.

10. The method of locating a sub-surface formation which comprises simultaneously generating elastic waves in the earth, sound frequency waves in the air and an electric impulse, receiving at a distant point a wave reflected by a sub-surface formation, receiving the electric impulse and sound frequency wave at said point and measuring the time of the reflected wave and sound frequency wave.

11. The method of locating a sub-surface formation which comprises simultaneously generating elastic waves in the earth, sound frequency waves in the air and an electric impulse, receiving at a distant point a wave reflected by a sub-surface formation, receiving at said point an elastic wave transmitted directly thereto through the earth and measuring the time of travel of the reflected wave, directly transmitted wave and the sound frequency wave.

In testimony whereof, I have signed my name to this specification.

JOHN C. KARCHER.